United States Patent [19]

Kathail et al.

[11] Patent Number: 5,692,169
[45] Date of Patent: Nov. 25, 1997

[54] METHOD AND SYSTEM FOR DEFERRING EXCEPTIONS GENERATED DURING SPECULATIVE EXECUTION

[75] Inventors: Vinod K. Kathail, Cupertino; Rajiv Gupta, Los Altos; Bantwal R. Rau, Los Altos; Michael S. Schlansker, Los Altos, all of Calif.; William S. Worley, Jr., Breckenridge, Colo.; Frederic C. Amerson, Santa Clara, Calif.

[73] Assignee: Hewlett Packard Company, Palo Alto, Calif.

[21] Appl. No.: 324,940

[22] Filed: Oct. 18, 1994

Related U.S. Application Data

[63] Continuation-in-part of Ser. No. 192,758, Feb. 7, 1994, abandoned, which is a continuation of Ser. No. 628,241, Dec. 14, 1990, abandoned.

[51] Int. Cl.$^6$ ............................................. G06F 9/00
[52] U.S. Cl. ........................................ 395/591; 395/800
[58] Field of Search ........................... 395/823, 824, 395/800, 375, 403, 433, 450, 452, 421.03, 376, 379, 390, 392, 561, 580, 591, 670, 676, 678, 700, 733; 364/131–134

[56] References Cited

U.S. PATENT DOCUMENTS

| | | | |
|---|---|---|---|
| 4,145,736 | 3/1979 | Yamada et al. | 395/375 |
| 4,287,562 | 9/1981 | Darden et al. | 395/550 |
| 4,396,906 | 8/1983 | Weaver | 341/65 |
| 4,467,415 | 8/1984 | Ogawa | 395/375 |
| 4,539,635 | 9/1985 | Boddie et al. | 395/775 |
| 4,881,194 | 11/1989 | Sprague et al. | 395/375 |
| 5,517,628 | 5/1996 | Morrison et al. | 395/375 |
| 5,561,776 | 10/1996 | Popescu et al. | 395/375 |

FOREIGN PATENT DOCUMENTS

| | | |
|---|---|---|
| 0 372 751 A2 | 6/1990 | European Pat. Off. . |
| 0 675 434 A2 | 10/1995 | European Pat. Off. . |
| 2 284 493 | 8/1994 | United Kingdom . |

OTHER PUBLICATIONS

Sentinel Scheduling for VLIW and Superscalar Processors, by S.A. Mahlke, W.Y. Chen, W.W. Hwu, B. Ramakrishna Rau and M.S. Schlansker.

"Some Design Ideas for a VLIW Architecture for Sequential–Natured Software", by K. Ebcioglu, Part 1: Parallel Architecures, *Parallel Processing*, Proceedings of the IFIP WG 10.3 Working Conference on Parallel Processing, Pisa, Italy, 25–27 Apr. 1988, pp. 3–21.

IBM Research Report, "Some Global Compiler Optimizations and Architectural Features for Improving Performance of Superscalers", by K. Ebcioglu and R. Groves, pp. 1–13.

Sentinel Scheduling: A Model for Compiler–Controlled Speculative Execution, by S.A. Mahlke, W.Y. Chen, R.A. Bringmann, R.E. Hank, W.W. Hwu, B. Ramakrishna Rau and M.S. Schlansker, ACM Transactions on Computer Systems, Nov. 1993, pp. 1–47.

*Primary Examiner*—Alpesh M. Shah

[57] ABSTRACT

A method for supporting speculative execution includes designating operations as speculative or non-speculative, and then deferring exceptions generated by speculative operations while immediately reporting exceptions by non-speculative operations. If a speculative operation uses a result of a speculative operation that has generated an exception, the exception is propagated. Deferred exceptions are detected and reported using a check operation either incorporated into a non-speculative operation or inserted as a separate check operation. A system for supporting speculative execution includes a functional unit for recognizing a speculative operation and deferring any exceptions generated by such an operation. The functional unit may defer an exception by storing information indicating an error has occurred in the register file. To check for deferred exceptions, the functional unit then reads the register file.

19 Claims, 2 Drawing Sheets

METHOD AND SYSTEM FOR DEFERRING EXCEPTIONS GENERATED DURING SPECULATIVE EXECUTION

REFERENCE TO PARENT CASE

This is a continuation-in-part of patent application Ser. No. 08/192,758 to Rau and Schlansker, entitled "METHOD OF IMPROVING PERFORMANCE OF PARALLEL-PROCESSOR COMPUTER USED TAGGED OPERANDS TO CONTROL EXCEPTION," filed Feb. 7, 1994, now abandoned, which is hereby incorporated by reference, and which is a continuation of 07/628,241, filed Dec. 14 1990, now abandoned.

FIELD OF THE INVENTION

This invention generally relates to code optimization in computer scheduling and more particularly the architectural support for such optimization.

BACKGROUND OF THE INVENTION

The performance of a computer system may be enhanced by optimizing the code of a computer program so that the computer can execute the program more quickly. One of the steps in optimizing a program is a process called scheduling. Scheduling is a process where the series of computer operations that comprise a program are organized for execution. During the scheduling process, operations of the program may be arranged, eliminated, or moved to make the program run more efficiently for a particular CPU design. Generally, there are two forms of scheduling: dynamic scheduling performed by the hardware during execution of a program, and static scheduling performed by a compiler before execution. Either of these techniques, or a combination of both, may be used to schedule operations in a computer program for processing by a computer system.

A computer program consists of a series of instructions to be carried out by a central processing unit (CPU) in the computer system. A typical program is written in a high level language and then compiled into a series of instructions compatible with the instruction set architecture of the CPU. A program, however, may also be directly written in "machine language" according to the instruction set architecture of the computer. The instruction set architecture defines the format or encoding of operations, including operators and operands in an instruction. Depending on the structure of the CPU and the scheduling techniques involved, each instruction may have one or more operations. An operation includes an operator encoded in an opcode representing functions such as add, subtract, load, store, branch, etc. Additionally, an operation identifies the operands and the results of the operation. To accomplish this, the operation typically includes a code identifying the location such as a register of an operand or operands. It is these operations that are organized for execution by the CPU using the optimization techniques.

There are different levels of optimization. One level of optimization is local optimization where code within a straightline code fragment or "basic block" is manipulated to run more efficiently. Examples of local optimization techniques are common subexpression elimination and constant propagation. Another level of optimization is global optimization which includes extending local optimization techniques across conditional branches in a program and further includes transformations for optimizing loops. One form of global optimization is code motion. An example of code motion is removing code from a loop that computes the same value each iteration of a loop. A third level of optimization is machine dependent optimization. Machine dependent optimization involves manipulation of code to take advantage of specific architectural attributes of the CPU. For example, if the CPU has a pipelined functional unit for executing instructions concurrently, then code can be reordered to improve pipeline performance.

To optimize a program, code may be moved above a conditional branch in a scheduling process called speculative code motion. Speculative code motion refers to the movement of an instruction above a conditional branch that controls its execution. The execution of a "speculative" instruction may be referred to as a speculative or anticipatory execution because the instruction is executed before it is known whether the instruction will actually be used in the program. Speculative code motion can enhance instruction level parallelism. Because many instructions have a long latency, meaning they take several clock cycles to execute, it is advantageous to execute an instruction speculatively. The delay that an instruction would otherwise cause can be minimized by issuing the instruction in advance. Speculative code motion may also be useful in other optimizations such as redundancy elimination.

While speculative execution has the potential for enhancing performance, it has not been effectively implemented due to the problems in dealing with errors in speculative instructions. If a speculative instruction generates an error, the error should be deferred and should only be reported if the speculative instruction is actually used in the program. Otherwise, errors that would not have been reported in the original program would be reported, and the behavior of the program would be changed.

Existing optimization techniques have not effectively addressed the problems with moving code across conditional branches. One way to address the error problem is to prevent speculative code motion for instructions that may generate an error. This solution has serious limitation because only non-error generating operations may be moved. Another potential solution is to ignore all errors. This solution is unsatisfactory because it prevents error handling or reporting.

SUMMARY OF THE INVENTION

To address the drawbacks and limitations of existing optimization techniques, the invention provides a method and system for providing support for speculative execution. In one embodiment, the method includes providing two versions of the operations in the instruction set, a speculative version and a non-speculative version. Operations that are moved above conditional branches are encoded as speculative operations. Both speculative and non-speculative operations are then executed by a CPU. If a speculative operation generates an exception, then the exception is deferred. An exception from a speculative operation may be propagated if the result of a first speculative operation is used as an input to a second speculative operation. If a non-speculative operation generates an exception, the exception is handled or reported immediately. The step of executing a non-speculative instruction may include checking for deferred exceptions. If a deferred exception is detected, then the exception is reported.

In a second embodiment, the method includes providing natively speculative operations in the instruction set. These natively speculative operations are treated as speculative operations for scheduling and for deferring exceptions.

However, these operations do not need to be identified as speculative operations by encoding them as such in the opcodes. Rather, the CPU treats a predetermined set of operations as natively speculative. To enhance the compatibility of the CPU with existing programs, the CPU can also include two modes of operation: a first mode where the predetermined set of operations are natively speculative, and a second mode where the predetermined set of operations are non-speculative. As in the first embodiment above, exceptions for speculative operations are deferred while exceptions for non-speculative operations are reported immediately.

A system for supporting speculative execution may be implemented in a CPU including a functional unit and register file. During execution of operations in a program, the functional unit of the CPU recognizes whether an operation is speculative or non-speculative. If a speculative operation generates an exception, the functional unit stores information in a register in the register file indicating that an exception has been deferred. In one implementation, the registers in the register file may include an error tag for identifying whether an exception has been deferred. A non-speculative operation may be used to check for deferred exceptions. In the process of executing such an operation, the functional unit checks the register file to determine whether an exception has been deferred. If an exception has been deferred, the functional unit reports the exception.

The method and system for providing support for speculative execution provide several advantages. Exceptions generated by speculative operations are ignored unless the speculative operation is actually used in the program. As a result, the computer system achieves the performance gains provided by speculative execution without losing full error detection and reporting capabilities. Employing the approach of one embodiment, speculative execution may be implemented in an instruction set architecture where speculative and non-speculative versions are provided for several operations. If, however, such an approach is not possible in a particular instruction set architecture, speculative execution can be supported by treating several operations as natively speculative without changing or specially encoding opcodes.

This alternative approach is especially useful in retrofitting an existing instruction set architecture to support speculative execution. To retrofit an existing system, the hardware of a CPU can be modified to support speculative execution while maintaining compatibility with programs written for an existing instruction set architecture. The instruction set is not materially changed, but instead, the hardware semantics of the operations are changed to add support for deferring and checking for deferred exceptions generated by speculative operations. In this approach, the CPU supports two modes of operation: a first mode where operations are non-speculative; and a second mode where some operations are treated as natively speculative. The second mode differs from the first in that exceptions are deferred for natively speculative. operations. By supporting these two modes of operation, the CPU is compatible with the binary form of programs compiled for an existing instruction set architecture whether or not the programs have been optimized using speculative code motion.

Further advantages and features of the invention will become apparent to those skilled in the art from the following description and accompanying drawings.

DETAILED DESCRIPTION

Figure 1:
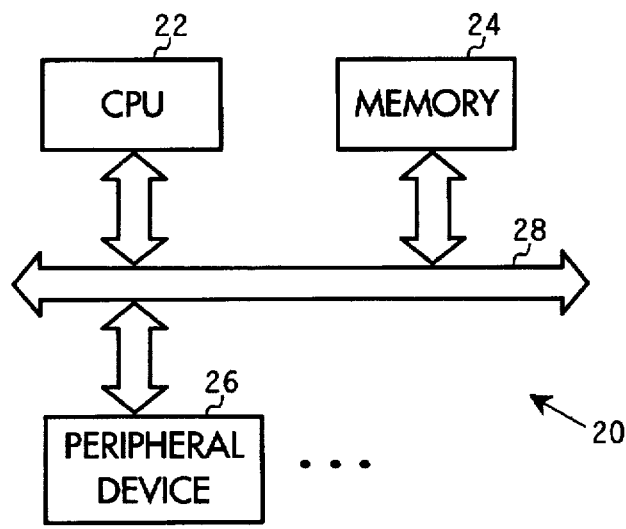
FIG. 1 is a block diagram of a computer system in which an embodiment of the invention may be implemented.

An embodiment of the invention generally provides a method and system for supporting speculative execution. The following description begins with a general explanation of speculative execution. Next, systems for supporting speculative execution are described. Finally, a method for supporting speculative execution is described according to embodiments of the invention.

Speculative code motion can be used effectively in CPUs having concurrent processing capability. A CPU can execute a series of operations more quickly by issuing separate operations at the same time or overlapping the execution of operations. A typical CPU executes an operation in stages. In a CPU having more than one functional unit for executing operations, the CPU can issue multiple operations and perform the same stage for multiple operations simultaneously. In a pipelined processor, the CPU includes a pipeline for processing each stage in an operation like an assembly line. Pipelining reduces overall processing time of a program by enabling the processor to execute different stages of several instructions simultaneously. A CPU can include either multiple functional units or pipelining, or can combine both features.

In concurrent processing CPUs, speculative code motion can optimize performance by addressing the latency problem. Latency is the time required for the CPU to complete an operation. An operation with long latency can stall or delay execution of a program while the CPU waits to complete an operation before beginning another. Without speculative code motion the CPU muse evaluate a branch condition before issuing any of the operations after the branch. By moving an operation above the conditional branch, the CPU can issue the operation in advance as a speculative operation. In a CPU with multiple functional units or pipelining, the CPU can process the speculative operation concurrently with other operations. If the branch where the operation originated is followed, then the operation will be either partially or entirely completed by the time the program reaches the operation's original position. Speculative code motion addresses the latency problem by reducing or even eliminating the stall in execution of an operation. Speculative code motion is particularly useful in processors with concurrent processing capability because the CPUs in such systems have the capacity to process multiple operations at once.

The process of executing speculative instructions is called speculative execution. Speculative code motion may be implemented in a variety of scheduling techniques to provide support for speculative execution. Speculative code motion may be used in connection with multiple functional unit or pipelined CPUs to exploit parallelism and thereby optimize a program. Speculative code motion can be used in conjunction with partial redundancy elimination to optimize a program for virtually any type of CPU. In addition to scheduling support, speculative execution also requires architectural support.

To implement speculative execution, two primary issues must be addressed: speculative code motion, and exception detection and reporting. In this context, speculative code motion refers to the scheduling technique used to move operations above their associated branches. Exception detection and reporting relates to scheduling in view of possibility that a speculative operation may generate an error. Additionally, it refers to detecting and reporting errors generated by speculative operations. Because these issues are closely related to scheduling, they are discussed first in the context of scheduling to support speculative execution. Next, a preferred method of exception detection and reporting is discussed.

Before a program is executed, a scheduler optimizes the program by using speculative code motion and perhaps other optimization techniques to decrease processing time of the program. The scheduler may be dynamic or static, or may include a combination of compiler and hardware scheduling. Any of a number of well known scheduling techniques may be used, including but not limited to trace scheduling, modulo scheduling, and enhanced pipelining. Regardless of the scheduling technique used, the scheduler should include support for speculative code motion.

Speculative code motion includes moving an operation from its home basic block to a previous basic block. A basic block is a straight line sequence of operations followed by a single branch. The home basic block of an operation is the basic block in which it resides in the original program. The previous basic blocks for a given basic block are all the basic blocks that can branch to the given basic block or that sequentially precede the basic block. During scheduling, an operation may be moved across a branch to a set of previous basic blocks. The operation is moved such that the operation will always be executed before any use of its result will occur. To satisfy this requirement, the operation may be moved to multiple preceding basic blocks. This general technique of speculative code motion may be used in variety of scheduling methods.

One method for scheduling across basic blocks is superblock scheduling. A superblock is a block of operations where control can only enter from the top but may exit at one or more points. Superblock scheduling consists of two steps: dependence graph construction and list scheduling. The dependence graph represents the control and data dependencies between operations in a superblock. Using control dependencies, the scheduling technique can address restrictions on speculative code motion. In this context, the two primary restrictions on moving an operation above a branch are 1) the result of the operation is not used before it is redefined when the branch is taken; and 2) the operation will not cause an exception that alters the results of the program when the branch is taken.

Different scheduling techniques using the superblock model may address these general restrictions on speculative code motion. For most scheduling techniques, the first restriction can be overcome using compile-time renaming transformations. After control dependencies are eliminated, list scheduling using the dependence graph, instruction latencies, and resource constraints may be performed to determine how operations are scheduled. The problem of exceptions may be handled differently depending on the scheduling technique.

An exception is an error such as arithmetic underflow or overflow, an undefined instruction, or a memory access error. When an operation causes an exception in a non-speculative system, the exception is typically reported immediately, and the CPU branches to an exception handling routine of the operating system. If speculative operations immediately reported an exception, then the CPU would have to perform potentially unnecessary and semantically incorrect error handling for speculative operations that may ultimately not be in the execution path of the program.

The preferred way of dealing with exceptions in speculative operations is to defer reporting of the exceptions. The exception is only reported if the operation is actually executed in its home basic block. By deferring such exceptions, unnecessary exception handling is avoided. The computer system provides enhanced performance and preserves the semantics of the original program.

If the result of a speculative operation that generates an exception is used as an input to a second speculative operation, then the exception is propagated to the second operation. An exception will be propagated through any speculative operations that use the result of a speculative operation generating an error. These propagated exceptions will only be reported if the exception is propagated to an operation that is actually used in the execution path of the program.

To support deferred reporting of exceptions, a system according to an embodiment of the invention includes a means for deferring the exception. An exception may be deferred using a buffer or a tag in the register to keep a record that an error has occurred. The system also includes a means for reporting a deferred exception. The home block of a speculative instruction includes an operation for checking whether an exception has occurred. This operation may be an additional check operation inserted in the home block or may be incorporated into a non-speculative operation in the home block. An implementation of these aspects of a computer system are described below.

As an overview, FIG. 1 illustrates a generalized block diagram of a computer system 20 in which a system according to the invention may be embodied. The computer system 20 includes a CPU 22 coupled to memory 24 and one or more peripheral devices 26 via a system bus 28. The system bus 28 may carry data and control signals to the CPU 22, memory 24 and peripheral devices 26. The memory 24 preferably includes Random Access Memory (RAM), but may also be implemented with Read Only Memory (ROM), or a combination of RAM and ROM. The memory 24 stores data for one or more programs that may be executed in the computer system 20.

Figure 2:
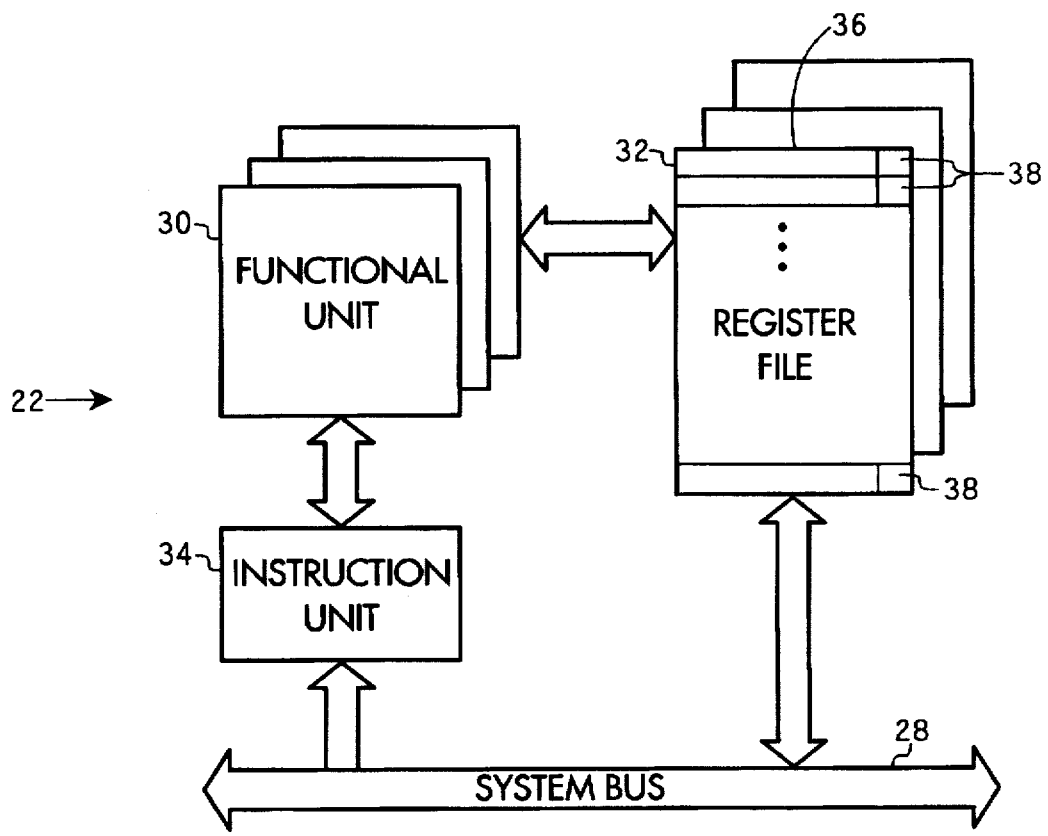
FIG. 2 is a block diagram of a central processing unit according to an embodiment of the invention.

FIG. 2 is a block diagram of a CPU 22 according to an embodiment of the invention. The CPU 22 includes multiple functional units 30, one or more register files 32, and an instruction unit 34. The register files 32 typically contain several general purpose registers 36 for storing values, addresses and possibly other data. In addition, the registers 32 in the register file 36 may include an error tag bit 38 for identifying whether an exception has occurred. The use of the error tag bit 38 in speculative execution will be discussed in further detail below.

The architecture of the CPU 22 may vary. This particular architecture merely depicts the high level hardware design of a CPU 22 according to one possible embodiment. Speculative execution implemented according to the invention can provide performance improvement in a variety of CPU designs, including in particular, CPUs with multiple functional units or CPUs with multiple pipelined functional units. Speculative execution is particularly effective in enhancing performance in superscalar or Very Long Instruction Word (VLIW) computers.

In the process of running a program, the CPU 22 carries out a series of instructions stored in memory 24. The instruction unit 34 fetches an instruction from memory via the system bus 28 and then decodes the instruction. Depending on the type of CPU and/or the scheduling method used, an instruction may have more than one operation. The instruction unit 34 issues operations to a functional unit 30 or to multiple functional units (shown as stacked boxes in FIG. 2). The instruction unit 34 sends control signals to a functional unit 30 to carry out the operation or operations in an instruction. In response to these control signals, the functional unit 30 reads data such as address or value from the appropriate registers in the register file 32 and performs an operation. For some operations, the functional unit 30 writes a result back to the register file 32. For a memory store operation, the functional unit 30 reads a memory address and a value stored in the register file 32 and transfers the value directly to memory 24.

Figure 3:
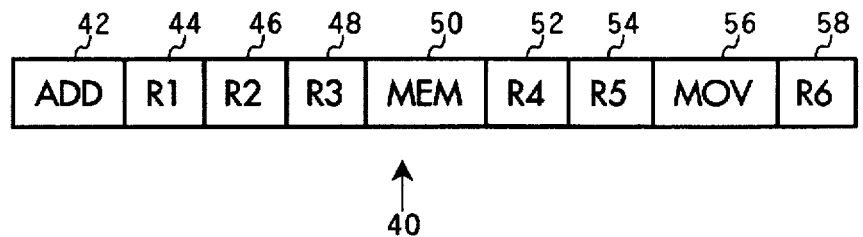
FIG. 3 is a diagram of an instruction having multiple operations.

FIG. 3 illustrates the format of an instruction 40 having multiple operations. The instruction includes three operations, each including an opcode and one or more operands. Starting from the left, the first operation in the instruction includes an opcode 42, a destination register field 44, and two source register fields 46, 48. The second operation has an opcode 50 and two source register fields 52, 54. Finally, the third operation has an opcode 56 and only a single source register field 58. The source register fields specify the location of the inputs to the operation, and the destination register field specifies the location of the result.

These three operations provide an example of a typical instruction. The first operation is a arithmetic ADD operation in which the functional unit 30 reads values stored in registers R1 and R2, adds them, and writes the result to register R3. The second example operation is a memory operation 50 in which the first register R4 stores an address and the second register R5 stores a value. The functional unit 30 reads the address and value from the registers and stores the value in memory 24 at the specified address. The third example operation is a simple move (MOV) operation. To support speculative execution, the hardware semantics of this operation may be modified so that the operation may be used to check for deferred exceptions.

For example, the functional unit 30 reads the source register R6 and if an exception has occurred, initiates a branch operation to an error handling routine. The source register for the check operation is the same as the register to be checked for a deferred exception. The source register of the check operation may be the destination register of a speculative operation that has generated and deferred an exception, or of a speculative operation that has propagated the deferred exception. In either case, the source register that is checked contains information about the deferred exception.

A system for supporting speculative execution may be implemented in a computer system 20 as described with reference to FIGS. 1–3. There are several alternative ways to implement a system according to the invention. While two specific embodiments will be described below, it should be understood that other variations are possible and will be apparent to those of ordinary skill in the art.

A first embodiment of the invention includes encoding speculative and non-speculative versions of operations in the instruction set architecture of the CPU. In this embodiment, the opcodes identify whether an operation is non-speculative or speculative. For example, the opcode 42 of the ADD operation in FIG. 3 could be encoded to designate the operation as either speculative or non-speculative. The version of the operations affects whether an exception generated by the operation will be reported or deferred. If a non-speculative operation generates an error, the functional unit 30 reports the error immediately. If a speculative instruction generates an exception, on the other hand, the functional unit 30 will defer reporting the exception. In the latter case, the exception will only be reported if the result of the operation is actually used in its home basic block.

A second embodiment of the invention provides a system for supporting speculative execution in a minimum instruction set architecture. In contrast to the first embodiment, this second embodiment supports speculative execution without including opcodes for speculative operations. Instead, the system treats a number of predetermined operations in an instruction set as speculative without requiring that operations be specially encoded. Like the first embodiment, this second embodiment also includes architectural support for deferring exceptions from speculative operations and for reporting these deferred exceptions.

In the second embodiment, the scheduler and CPU may treat a predetermined set of operations as speculative. This set of operations may potentially include any operation in the instruction set. However, operations whose effects are difficult to undo such as branch operations or operations visible outside the CPU should generally not be executed speculatively. All of the operations that are not visible outside the CPU may be treated as natively speculative operations by changing the hardware semantics in the functional unit 30. To support speculative execution in this embodiment, natively speculative operations are scheduled as speculative operations, and the CPU hardware includes support for deferring and reporting deferred exceptions from these operations. While a predetermined set of a operations are treated as natively speculative in the CPU, operations visible outside the CPU remain non-speculative. An example of an operation visible outside the CPU is a memory store. It is considered to be visible outside the CPU because it interacts with memory outside the CPU, and more specifically, involves overwriting a location in memory 24. It is not preferable to execute such an operation speculatively because it may affect another process interacting with the same memory location. It is also more difficult to correct an error generated by an operation that affects the state of external hardware. For these reasons, it is preferable to treat operations visible outside the processor as non-speculative.

Using the approach of the second embodiment, an instruction set does not require speculative and non-speculative versions of operations. As a result, speculative execution can be supported in a manner that maintains compatibility with an existing instruction set architecture. The operations that are treated as natively speculative and non-speculative vary with the architecture of the CPU. In some systems, all operations except those visible outside the CPU can be treated speculatively. In one alternative, all operations could be treated as natively speculative. In another alternative, some operations could be natively speculative while others are provided as both speculative and non-speculative.

A system according to the second embodiment may be designed to be compatible with the binary form of a program, whether or not it has been optimized using speculative code motion. To take advantage of the speculative execution supported in the CPU, programs are optimized using speculative code motion to move operations for which the CPU has a speculative version. Two categories of programs may therefore exist: existing programs that have not been optimized using speculative code motion, and new programs that have been specifically optimized for the speculative execution supported by the CPU. To maintain compatibility with both programs, the CPU may include circuitry to support a non-speculative mode and a natively speculative mode.

If the CPU is to support both modes of operation, it must include circuitry for recognizing whether a program has been optimized for speculative execution. This circuitry may include a register such as the status word register where a mode bit may be stored. Before the CPU begins execution of a program, it reads this register and switches to the appropriate mode. The mode bit may be set in a variety of ways. For example, if a program has been compiled to take advantage of speculative execution supported in the CPU, then the operating system may be programmed to set the mode bit. Alternatively, the compiler of the program may set the mode bit by identifying the mode in a status operation placed in the binary form of the program. Many other ways of specifying the mode of operation are possible and will be apparent to those of skill in the art.

While a system according to the second embodiment need not support two modes of operation, it is advantageous to support two modes of operation to maintain compatibility with existing programs. If the CPU is to execute only programs that have been specifically optimized for speculative execution, then the CPU need not support a non-speculative mode. An advantage of the second embodiment, however, is to maintain compatibility with existing instruction set architectures and programs that have already been compiled to run on CPUs based on these architectures. If compatibility with existing programs is important, then the CPU should support both a speculative and a non-speculative mode of operation.

The first and second embodiments include architectural support for deferring and reporting exceptions. This may include an error tag bit 38 in the registers of the register files. When an exception occurs in a speculative operation, the functional unit can set the error tag bit to indicate that an exception has occurred. This exception is not reported immediately, but rather, is deferred. Information about the exception may be written in the destination register to assist in error handling. This information may identify the instruction, and the operation within the instruction, which generated the exception. For example, the information may uniquely identify the program counter value of the operation that generated an exception. It may also identify the type of exception such as an address violation, arithmetic underflow and overflow, etc. If another speculative operation uses the result of this operation as an input, then the exception is propagated. To propagate the exception, the error tag bit 38 is set in the destination register, and the exception information is copied into the destination register. In this manner, the system may defer exceptions generated by speculative operations until the result of the operation is actually used in the execution path of the program.

An error tag bit 38 is only one way of deferring an exception. Other hardware may also be used. For example, a speculative operation that generates an exception can write information to a buffer identifying that an exception has occurred and including exception information used in error handling. If the speculative instruction is actually used in the execution path of the program, then the error information can be read from the buffer, and the exception can be handled accordingly.

A system constructed according either the first or second embodiment of the invention also includes architectural support for reporting deferred exceptions. This support may include a check function incorporated into a non-speculative operation or may include the addition of a separate check operation. If operations visible outside the CPU are non-speculative, then a check operation could be incorporated into one of these operations. For example, as part of a memory store operation, the functional unit 30 could check for deferred exceptions. As described above, a memory store operation has two source registers—one that contains the datum to be stored in memory and one that contains the memory address. A memory store operation, when acting as a check operation, checks both of its source registers for deferred and/or propagated exceptions.

Referring to the example instruction in FIG. 3, the memory store operation could include exception detection semantics. As part of the memory store operation, the functional unit 30 would read the exception tag bit 38 of the source registers of the memory store operation to determine whether an exception has been deferred. If an exception has been deferred, the memory store operation would then execute a branch to an error handling routine.

As another example, a separate check operation could be created. This would involve encoding only one additional opcode for a check operation. These check operations may be inserted during the scheduling process. Check operations should be inserted so that each speculative operation that may generate or propagate an exception can be checked. The source register of the check operation may be the destination register of the excepting operation. Also, the source register may be a destination register of the last operation in a chain of propagated exceptions. To ensure that speculative operations are checked, check operations may be inserted after a speculative operation or after a chain of speculative operations. Because an exception is propagated to all operations that use the result of a speculative operation that has generated an error, the check operation need not be inserted for every speculative operation.

Referring again to FIG. 3, the third operation is an example of a check operation that may be used to check for deferred exceptions. This operation has only one source and no destination register. If an exception has been deferred, the source register of a check operation contains information that identifies the type of exception and operation that generated the exception. When an exception is detected, the information in the source register of the check operation may be used to handle the exception. Typically, when an exception is detected, the CPU branches to an exception handling routine.

It should be understood that the foregoing discussion describes one of many possible ways of detecting and reporting a deferred exception. As another alternative, a check operation could check an operation at a memory location to determine whether the operation at this location generated an error. For example, the check operation could check an operation in memory identified by its program counter address. The check operation may be encoded to check a program counter address such as "check operation at PC address 535" or "check the third last operation." This form of check operation could be an alternative to checking the destination register of a speculative operation. Since this check operation would not involve checking a destination register for a deferred exception, an additional buffer may be used to store information about the type of exception used to assist in error handling.

Figure 4:
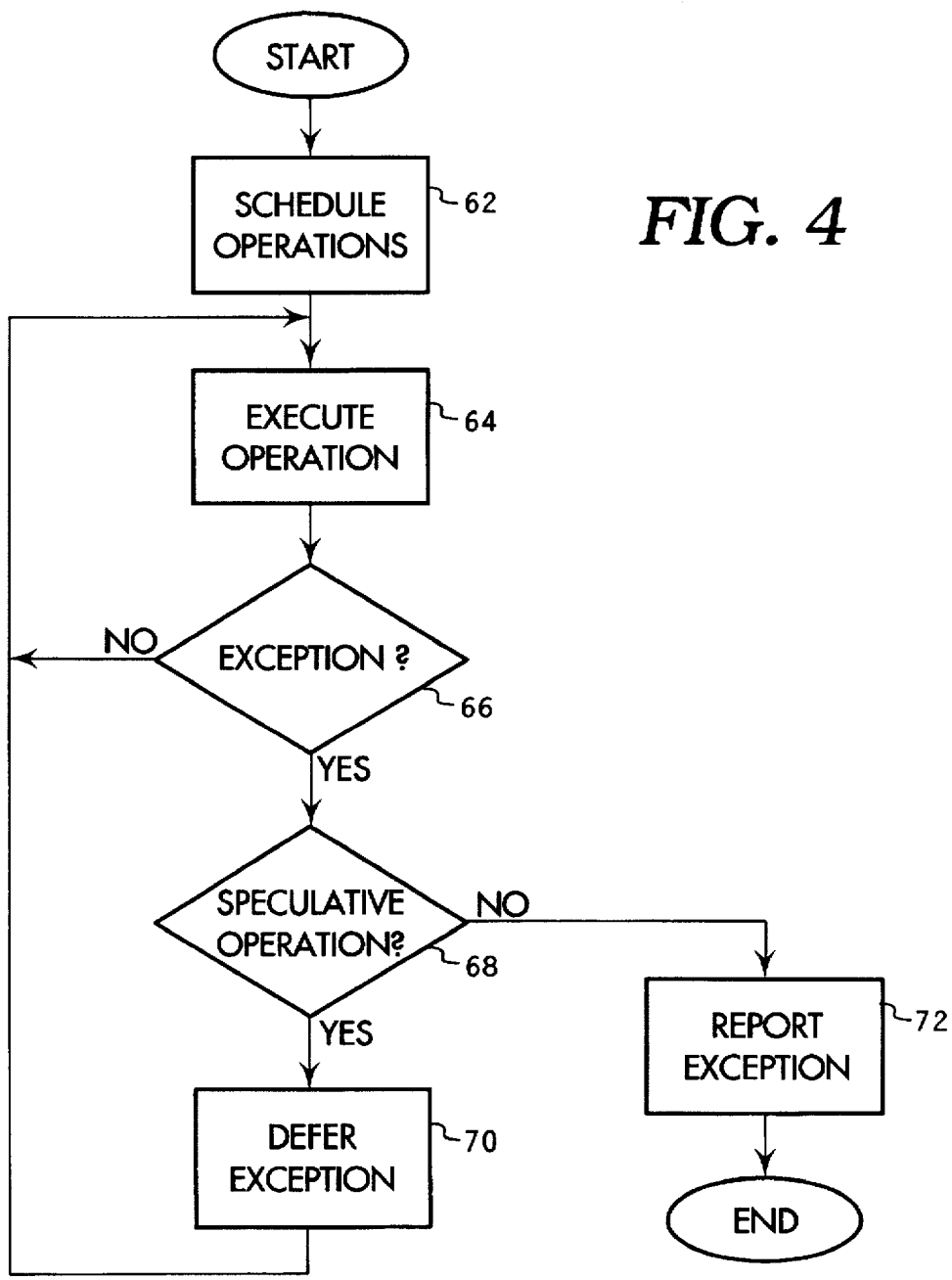
FIG. 4 is a flow diagram of a method for supporting speculative execution according to an embodiment of the invention.

FIG. 4 is a flow diagram of a method for supporting speculative execution according to an embodiment of the invention. This diagram illustrates the operation of a system for supporting speculative execution according to the first and second embodiments of the invention.

In the first step 62, the operations are scheduled. As set forth above, the operations may be scheduled either dynamically or statically, or perhaps using a combination of both. As part of the scheduling step 62, a check operation may be inserted into the home basic blocks of operations that have been moved above a conditional branch. In the first embodiment, the opcodes of speculative operations are encoded to distinguish them from a non-speculative version of the same operation. In the second embodiment, a number of predetermined operations are treated as speculative without being encoded as such. Once the program is scheduled, the CPU begins issuing operations for execution.

An operation is executed in the next step 64. In a CPU with multiple functional units 30 as shown in FIG. 2, operations may be issued to separate functional units simultaneously. If the functional units 30 are also pipelined, several operations may be at varying stages of execution at one time for each pipeline.

If an exception occurs during the execution of an operation (66), then the system reacts differently depending on the type of operation (68). For speculative operations, the exception is deferred (70). For non-speculative operations, however, the exception is reported and an error handling routine is initiated (72). Non-speculative operations are those operations that have not been moved above a conditional branch, but rather, remain in their home basic block. Depending on the implementation, non-speculative operations can include any type of operation. Examples of non-speculative operations include memory store operations that are not moved above a branch because they are visible outside the CPU, or a check operation that is inserted into the home basic block of speculative operations to check for a deferred exception.

Depending on how the system is implemented, an operation is identified as speculative or non-speculative in different ways. In the first embodiment, speculative and non-speculative operations are differentiated by their opcodes. In the second embodiment, a predetermined number of operations are treated as speculative operations without requiring special encoding of the opcodes for these speculative operations. The CPU recognizes these natively speculative operations and defers exceptions generated by them. Similarly, the CPU recognizes the operations that are natively non-speculative and immediately reports any errors generated by them.

To maintain compatibility with existing programs, the CPU in the second embodiment may have two modes of operation: a speculative mode and a non-speculative mode. In the speculative mode, the predetermined set of operations are treated as natively speculative. Exceptions are deferred for these natively speculative operations. In the non-speculative mode, the predetermined set of operations are treated as non-speculative and exceptions are not deferred for these operations.

It is possible to treat a number of operations as natively speculative while also specifically encoding speculative and non-speculative operations. For example, all operations not visible outside the CPU could be natively speculative while all other operations such as a memory store could be provided in speculative and non-speculative versions. This approach is subject to the limitations of the particular instruction set architecture, which may or may not have enough flexibility to add additional opcodes.

The sequence of steps (64-70) may include propagating a deferred exception. At the execution step 64, the functional unit 30 reads the error tag to determine whether an exception has occurred previously (66). If the operation is speculative (68), then the exception will be propagated by setting the error tag bit of the result register and transferring exception information to the result. Propagating an exception in this fashion, the system defers the exception (70) and reports it only if it is used in a non-speculative operation.

The sequence of steps (64-72) may include detecting and reporting a deferred exception. An exception is detected by executing a non-speculative operation (64) with error checking capability. Executing this type of operation includes checking for a deferred exception (66). The means for checking for a deferred exception vary depending on the implementation. Non-speculative operations may be implemented such that they check for a deferred exception by reading the error tag bit of an input or source register. For example, a memory store instruction may, as part of its semantics, read the error tag bit to check for a deferred exception and report an exception if one has been deferred. As another example, a check operation inserted into a home basic block may check for an exception be reading the error tag bit of a result register or registers of speculative operations from that home basic block. If an exception has been deferred, the exception will be reported immediately (72). In this manner, the system for supporting speculative execution defers exceptions generated in speculative operations.

Though the system and methods of the invention have been described in detail in the context of alternative embodiments, it should be understood that the invention may implemented in a variety of ways without departing from the scope of the invention. For example, the instruction set architecture can include non-speculative and speculative versions of operations, natively speculative operations, or a combination of both. The means for deferring an exception may vary depending on the CPU architecture. For example, a single error tag bit may be added to general purpose registers in a register file, or perhaps a buffer could be used to keep track of deferred exceptions. The means for checking for deferred exceptions may vary as well. As described, the hardware semantics of a CPU can be designed to check for deferred exceptions when one or more types of non-speculative operations are executed. Alternatively, a separate check operation could be added to the instruction set architecture. Many other variations to the embodiments are possible without departing from the scope of the invention.

In view of the many possible embodiments to which the principles of our invention may be put, it is emphasized that the detailed embodiments described herein are illustrative only and should not be taken as limiting the scope of our invention. Rather, we claim as our invention all such embodiments as may come within the scope and spirit of the following claims and equivalents thereto.

We claim:

1. A method for supporting speculative execution comprising:

providing an instruction set architecture for a central processing unit including non-speculative and speculative operations, at least one of the speculative operations being natively speculative such that the at least one natively speculative operation is not encoded as a speculative operation;

scheduling operations in a computer program including the step of moving speculative operations above conditional branches;

executing operations in the central processing unit including the steps of:

if the operation is a speculative operation and generates an exception, then deferring the exception;. and if the operation is a non-speculative operation and generates an exception, then reporting the exception.

2. The method of claim 1 wherein the providing step includes providing a predetermined set of operations in the instruction set architecture that are natively speculative operations.

3. The method of claim 1 wherein the providing step includes providing a predetermined set of operations in the instruction set architecture for the central processing unit that are either all natively speculative or all non-speculative depending on a mode of the central processing unit; and further including the steps of:

specifying the mode of the central processing unit by setting a mode bit in a status register of the central processing unit;

and reading the mode bit in the status register to determine the mode of the central processing unit.

4. The method of claim 1 wherein the providing step includes providing a speculative and non-speculative version of a set of operations in the instruction set architecture.

5. The method of claim 4 wherein the speculative and non-speculative version of the set of operations are encoded in a set of opcodes.

6. The method of claim 1 wherein the step of deferring an exception includes storing information indicating that an error has occurred.

7. The method of claim 6 wherein the step of deferring an exception includes setting an error tag bit in a result register of a speculative operation that generates an exception.

8. The method of claim 1 wherein the step of executing an operation includes checking for a deferred exception.

9. The method of claim 1 wherein the step of executing an operation includes propagating a deferred exception if the input of a second speculative operation is a result of a first speculative operation that has generated an exception.

10. The method of claim 1 wherein the step of executing an operation includes executing a non-speculative operation to check for deferred exceptions.

11. The method of claim 10 wherein the non-speculative operation includes a check function for checking for deferred exceptions.

12. The method of claim 10 wherein the non-speculative operation is a check operation inserted in a home basic block of an associated speculative operation to check for a deferred exception from the associated speculative operation.

13. The method of claim 1 wherein the scheduling step includes inserting a check operation in a home basic block of a speculative operation to check for deferred exceptions.

14. A method for supporting speculative execution comprising:

providing a predetermined number of speculative operations in an instruction set architecture of a central processing unit;

specifying a mode of the central processing unit by setting a mode bit in a register of the central processing unit;

reading the mode bit in the register to determine the mode of the central processing unit and if the mode bit indicates that the speculative operations are to be operated as non-speculative operations, then operating the speculative operations as non-speculative operations;

otherwise, executing speculative operations and if an exception is generated from a speculative operation then deferring the exception by storing information that identifies that an exception has occurred, executing a non-speculative operation including a check operation to check for a deferred exception, checking for a deferred exception by reading a destination register of a speculative operation, and if an exception is detected in a non-speculative operations, then reporting the exception.

15. The method of claim 14 wherein the providing step includes providing a speculative and non-speculative version of a set of operations in an instruction set architecture by specifically encoding opcodes of the operations in the set to identify whether an operation is speculative or non-speculative.

16. A system for supporting speculative execution comprising:

a register file including a general purpose register; and a functional unit in communication with the register file for executing operations, the functional unit including circuitry for recognizing speculative and non-speculative operations, the functional unit in communication with the register file for storing information indicating that an exception has been deferred if a speculative operation generates the exception, and for checking for deferred exceptions;

wherein the circuitry for recognizing speculative and non-speculative operations includes a register for storing a mode bit identifying a mode of the central processing unit and further includes circuitry for reading the mode bit to determine whether an operation is to be treated as a speculative or non-speculative operation.

17. The system of claim 16 wherein the circuitry for recognizing speculative and non-speculative operations includes circuitry for reading an opcode of an operation to determine whether the opcode is a speculative or non-speculative version of the operation.

18. The system of claim 16 wherein the functional unit includes circuitry for signalling a deferred exception.

19. The system of claim 16 wherein registers in the register file include an error tag bit for indicating whether an exception has been deferred.

* * * * *